ADSORPTION OF ACETIC ACID ON ACTIVATED
CARBON AS A FUNCTION OF POTENTIAL

ADSORPTION OF AMYL ALCOHOL ON ACTIVATED
CARBON AS A FUNCTION OF POTENTIAL

INVENTORS
ALKIS C. MAKRIDES
SAMUEL B. BRUMMER
BY

Schiller & Pandiscio

ATTORNEY

United States Patent Office 3,730,885
Patented May 1, 1973

3,730,885
ELECTROCHEMICAL CONTROL OF ADSORPTION AND DESORPTION WITH ACTIVATED CARBON
Alkis C. Makrides, Newton, and Samuel B. Brummer, Wayland, Mass., assignors to Tyco Laboratories, Inc., Waltham, Mass.
Filed Jan. 21, 1971, Ser. No. 108,267
Int. Cl. B01d 15/06; C02b 1/14
U.S. Cl. 210—30
4 Claims

ABSTRACT OF THE DISCLOSURE

Method and apparatus for controlling the adsorption-desorption behavior of activated carbon. Adsorption and desorption are controlled by controlling the potential at the interface between the carbon and the solution containing the species to be adsorbed or the solution into which the adsorbed species are to be desorbed.

---

This invention relates to treatment of fluids by adsorption techniques and more particularly to an improvement in the use of activated carbon as a contact adsorbent.

Activated carbon is widely used in industry to remove impurities from fluids. By way of example, activated carbon is used to decolorize sugar solution, remove odors or flavors from drinking water, absorb gases and vapors, eliminate bacteria and toxic poisons from foods, facilitate separation of colloids and ultra-fine particles from liquids by filtration or centrifugation, and remove organic materials from waste water. Usually the activated carbon adsorbent is employed in the so-called percolation method, in which the absorbent (in granular form) is held in place and the liquid or solution to be treated is caused to flow over and through it. Once the carbon has been saturated with adsorbate, it must be regenerated (i.e. revivified), which involves stripping it of the adsorbate. The length of time which the activated carbon may be in service before it becomes saturated with foul products or impurities and must be regenerated will, of course, depend upon the amount of impurities passed through it per unit time. If properly regenerated, the carbon may be reused many times. Obviously, for industrial purposes, the regeneration process must be efficient and economical. Heretofore the most commonly used methods of regeneration are (1) heating the carbon to a temperature at which the adsorbate is vaporized or decomposes into gaseous products and (2) subjecting the carbon to steam cleaning. It also has been suggested that regeneration may be accomplished by oxidizing the adsorbates with chemicals such as chlorine and hydrogen peroxide. Regeneration by heating or steaming suffers from the limitation that the surface area of the carbon is degraded (often as much as 5–10%) during each regeneration. The losses in activity during regeneration are particularly critical in the case of activated charcoal which is more expensive than other commercially available activated carbons. Moreover the capital cost for regeneration can be substantial, particularly in water treatment plants. A further problem is that certain absorbates, notably organic materials, are difficult to desorb. Regeneration by oxidation with chemicals is unsatisfactory because regeneration is limited and tends to decrease rapidly after the first cycle.

Accordingly, the primary object of this invention is to provide a new and improved method of regenerating exhausted granular and powdered activated carbons.

A further object is to provide a method of selectively adsorbing materials by means of activated carbon.

Still another object is to provide an in situ method of regenerating activated carbons with substantially no loss in its activity (i.e. its surface area) and with minimum labor.

Described briefly, the present invention is an electrochemical technique for controlling and improving the adsorption and desorption of organic (and also inorganic) materials by activated carbon. Essentially the invention involves controlling adsorption and/or desorption by varying the potential at the carbon-solution interface. More particularly, the process essentially comprises applying a potential to the carbon which will allow substantially complete adsorption or desorption. The invention is applicable to plants for treating drinking water, chemical process solutions, and effluents from industrial waste and sewage treatment plants. Other features, uses, and advantages of the invention are disclosed or rendered obvious from the following detailed specification which is to be considered together with the accompanying drawing wherein:

Figure 1:
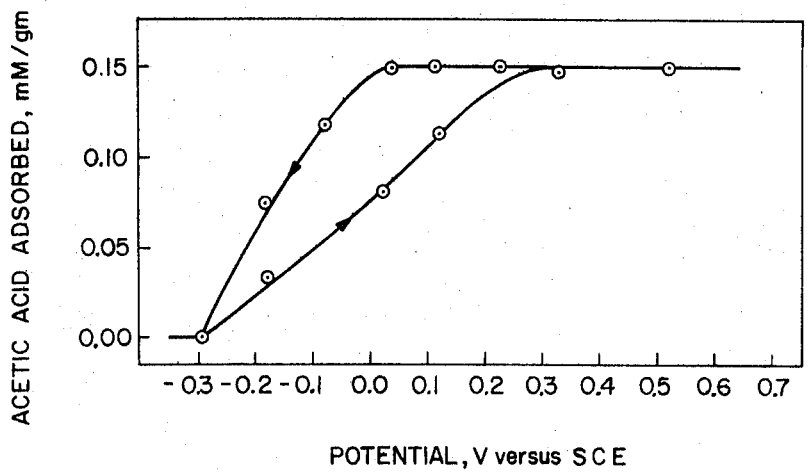
FIG. 1 shows adsorption and desorption of acetic acid on activated carbon.

A solid immersed in an electrolyte will assume a certain electrical potential, i.e., its surface will develop an excess of positive or negative charge. If the solid is electronically conducting, all the surface will be at the same potential. In the case of carbon the potential is determined (1) by solution species capable of undergoing redox reactions and (2) by dissolved oxygen. For example, a carbon electrode immersed in a water solution containing equal amounts of $Fe^{+2}$ and $Fe^{+3}$ will assume a potential of approximately $+0.554$ volt (versus a saturated calomel electrode) as determined by the equilibrium:

$$Fe^{+2} \rightleftharpoons Fe^{+3} + e^- \qquad (a)$$

In an oxygen containing solution, the potential will be determined by the process:

$$O_2 + 2H_2O + 4e^- \rightleftharpoons 4OH^-$$

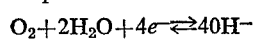

The exact potential is a function of $O_2$ concentration, pH and the ability of the carbon to catalyze the above reactions (some carbons are better than others). If soluble redox materials are also present in an oxygen containing solution, the potential will be intermediate, depending on the relative concentrations. The existence of this potential on the carbon surface constitutes a mechanism for the adsorption of electrolytes. In this connection it is well known that ions are adsorbed at solid-liquid interfaces and that the extent of their adsorption is controlled by the potential difference across the interface. Thus when the solid is at a positive potential, anions tend to be attracted to it. These in turn attract cations from the bulk of the solution, forming an electrical double layer; the net result is adsorption of electrolyte. Similar effects, originating from coulombic attraction of cations to the solid, take place at negative potentials. In certain cases it is possible to reach a potential on the carbon where there is no excess of either positive or negative charge. This is called the "potential of zero charge" or "p.z.c."; at this potential there is very little adsorption of either anions or cations. The p.z.c. depends upon the particular electrolyte in the solution.

We have postulated and confirmed by observation that adsorption and desorption of organic compounds by carbon depends on the potential at the carbon-solution interface.

It is well known that activated carbon readily adsorbs high molecular weight organic compounds and exhibits a preference for strongly polar organic material relative to organic compounds that show a weak polar characteristic. Adsorption of polar organic compounds involves dipole-dipole interaction with the carbon while adsorption of non-polar organics involves Van der Waals interactions. These are generally lower energy processes relative to electrostatic adsorption. It is also well known that adsorption from solution is a competitive process, i.e., would-be adsorbates (electrolytes and non-electrolytes) have to compete for the carbon surface. However, the electrostatic adsorption forces become weaker as the p.z.c. is approached so that few ions are adsorbed. Accordingly, as the p.z.c. is approached, the dipole-dipole and Van der Waals adsorption interactions assume greater relative importance and neutral species (e.g. non-electrolytes) are better able to compete for surface sites and to adsorb, with the adsorption of neutral species being maximum at the p.z.c. Furthermore, at potentials sufficiently removed from the p.z.c., the adsorption of neutral species becomes essentially zero and any neutral species adsorbed on the carbon will desorb and will be replaced by ions. Accordingly, in accordance with this invention, removal of organic materials from solution by adsorption on activated carbon and desorption of organic adsorbates is controlled by varying the potential of the carbon relative to the p.z.c. In this connection it is to be noted that the potential at which there is zero charge and the potentials required to effect the desired control of adsorption and desorption depend upon the composition of the particular solution in contact with the carbon. Although modification of the potential of the carbon can be achieved by adding electrochemically active species such as $H_2$ or $O_2$ to the solution, it is preferred that the potential of the carbon be adjusted by means of an electrical circuit.

Essentially in the practice of this invention, the carbon is an adsorbing and desorbing electrode and the construction and arrangement of the carbon electrode may vary depending upon the requirements of a particular process installation. Thus, for example, the carbon may be disposed in a solid matrix material so as to provide a unitary self-supporting porous structure (e.g. like a fuel cell electrode) or it may be disposed as a porous packed bed electrode through which soltuion can be percolated while the bed is under potential control.

The following examples illustrate how adsorption and desorption of organic materials can be controlled by potential according to this invention.

EXAMPLE I

A plurality of activated carbon adsorbing electrodes were made in the form of a hydrophilic rectangular fuel cell electrode from activated carbon and Teflon following the general procedure set forth in L. W. Niedmach and H. W. Alford, Journal Electrochemistry Society 112, 117 (1965). The carbon was Type BPL manufactured by Pittsburgh Activated Carbon Company of Pittsburgh, Pa. It had a surface area of 1000 square meters per gram. The carbon was ground to 325 mesh (average particle diameter=0.044 mm.), mixed with a Teflon-water dispersion (type 30 produced by E. I. du Pont de Nemours Co. of Wilmington, Del.). The carbon and Teflon-water dispersion were admixed so as to provide by weight a ratio of 17 parts carbon to 3 parts Teflon. This mixture was pressed onto a gold plated tantalum screen and air dried at room temperature for 24 hours. The final electrodes had a geometric area of 12 cm.$^2$. After fabrication, the electrodes were washed repeatedly in dilute HCl to remove acid-extractables from the carbon, and then thoroughly washed in NaCl solution. Then the electrodes were gently evacuated to remove gases. Preliminary tests showed that the electrodes produced currents as high as 1 ma./g. of carbon at potentials of possible interest. Accordingly, they were heavily oxidized by repeated galvanostatic charging using anodic currents of 100 to 300 ma. which substantially reduced the magnitude of the currents passed at potentials of interest.

Adsorption-desorption studies were then made at room temperature with an aqueous solution containing 500 parts per million (p.p.m.) of NaCl and 25 p.p.m. of acetic acid. One liter of this solution was placed in a vessel and continuously flushed with nitrogen and stirred magnetically. A standard saturated calomel electrode (SCE) and one of the carbon-Teflon electrodes were immersed in the solution and coupled to a potentiostat capable of controlling the potential of the carbon electrode to ±1.0 millivolt. Then the potential of the carbon electrode was varied and at each selected potential level acetic acid analysis in solution was carried out by titration with $10^{-3}$ N NaOH. The results are shown in FIG. 1. A total adsorption of about 0.15 milliequivalents of acetic acid per gram of carbon was reached at about 0.30 volts versus SCE. No adsorption was found when the electrode was held at −0.30 versus SCE. By switching from 0.30 volt to −0.30 volt it was determined that the adsorption-desorption cycle was reversible. The cycle was repeated four times and, within experimental error (1%), there was no degradation of the surface of the carbon electrode as a consequence of repeated adsorption and desorption. It was found that complete adsorption and readsorption was rapid (less than one hour) at potentials between about 0.4 and 0.75 volt vs. SCE; it also was found that complete desorption occurred repeatedly and rapidly (less than about one hour) at potentials of −0.60 volt to −0.30 volt but that at a potential above −.03 volt complete desorption took in excess of 18 hours. Some hysteresis in the potential region between −0.30 and +0.60 volt occurred as shown in FIG. 1. This hysteresis is believed due to slow surface oxidation state changes in this region, perhaps changing the p.z.c.

EXAMPLE II

Figure 2:
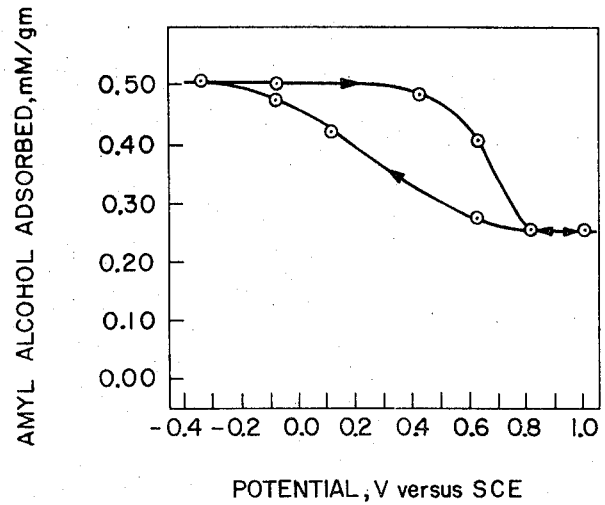
FIG. 2 shows adsorption and desorption of amyl alcohol on activated carbon.

An aqueous solution was prepared which consisted of 500 p.p.m. of sodium chloride and 25 p.p.m. of amyl alcohol. Then this solution was subjected to adsorption-desorption cycles using a carbon-Teflon electrode constructed as described in Example I. The procedure of conducting the adsorption-desorption cycles was the same as in Example I except that the potential was varied between about −0.4 and +1.0 volt. The results are shown in FIG. 2. The total adsorption was greater than for acetic acid and was equal to about 20% of a molecule monolayer. Adsorption was maximum in the middle potential region (−0.4 to +0.2 volt) as expected for an uncharged or neutral species. The adsorption process was reversible but about half of the adsorbed alcohol was desorbed. The remainder was not desorbed and this is believed due to chemical bonding between the carbon surface and the alcohol.

EXAMPLE III

A carbon-Teflon electrode was prepared according to the procedure of Example I but using unregenerated carbon taken from a tertiary sewage treatment plant. The carbon was reported to have a loading of about 10 grams TOC (total oxidable carbon in adsorbed organic compounds) per 100 grams of carbon. A second carbon-Teflon electrode was made in accordance with Example I. These virgin and unregenerated carbon electrodes were immersed in separate $10^{-2}$ M $Na_2SO_4$ solutions which were vigorously stirred and each electrode was subjected to an applied potential of +0.85 volt versus SCE. No measureable COD was released by the virgin carbon electrode; however, the regenerated carbon electrode released 22.25 milligrams per liter (mg./l.) of COD into the solution. Then the regenerated carbon electrode was removed from solution and introduced into a fresh $10^{-2}$ M $Na_2SO_4$ solution where further desorption was carried out at −0.3 volt versus SCE. A further 17.44 mg./l. of COD material was released, making a total of 39.69 mg./l. which was equivalent to 3.97 grams of COD/100 g. carbon.

EXAMPLE IV

A carbon-Teflon electrode prepared according to Example III was immersed in a one liter sample of sewage water from the primary treatment stage of the sewage treatment plant of Waltham, Mass. The water was oily and contained some particulate matter along with about 92.7 milligrams/liter of COD (chemical oxygen demand materials). It is well known that primary-treated sewage water results in extremely rapid degeneration of activated carbon and hence activated carbon is normally used only in the tertiary polishing stage of sewage treatment plants. The electrode was connected to a potentiostat as in Example I and its potential set at +0.8 volt versus SCE. It was observed that the COD of the treated water dropped from 92.7 to 32.25 mg./l., representing a loss of material by the solution of 60.45 mg./l. Then the potential was switched to 0.0 volt versus SCE and 18.15 mg./l. of COD reappeared in solution. Then the same electrode was placed in a new sample of the same sewage water and at a potential of +0.8 volt the new solution sample showed a loss of 56.7 mg./l. Then, without subjecting it to any electrochemical desorption, the same electrode was placed in another sample which showed a loss of 37.9 mg./l. of COD with the electrode at a potential of +0.8 volt.

Consideration of the results of Example IV reveals (a) at least part of the COD organic compounds in primary effluent can be electrochemically adsorbed on carbon, (b) that which is adsorbed can also be desorbed, (c) some organic matter is destroyed electrochemically, and (d) in contrast to chemical regeneration, there is no apparent loss in activity after the one adsorption-desorption cycle. With respect to the question of electrochemical destruction, it is to be noted that the 60.45 mg./l. lost from solution in the first run at 0.8 volt comprised 18.15 mg./l. released into solution from the electrode at 0.0 volt and 42.3 mg./l. which was destroyed electrolytically during the adsorption or desorption process. In the second exposure at 0.8 volt, where all organics at 0.8 volt had been desorbed at 0.0 volt, the quantity of material, i.e., 56.7 mg./l. adsorbed from the solution was similar to the quantity lost by the solution in the first exposure. In the third exposure at 0.8 volt, where all the material that could be adsorbed on the carbon from the sewage in the second exposure was still on the carbon, only 37.9 mg./l. was lost from solution. The difference of 18.8 mg./l. between 56.7 and 37.9 mg./l. is in good agreement with the results of the first exposure at 0.8 volt followed by the subsequent exposure at 0.0 volt. To further pursue the point, after the third exposure at 0.8 volt the carbon electrode was reexposed to a potential of 0.0 volt in $10^{-2}$ M $Na_2SO_4$, whereupon about 19.65 mg./l. of COD appeared in the solution. This confirmed that about 19 mg./l. of COD were reversibly adsorbed and desorbed by each gram of carbon from the primary sewage water and about 40 mg./l. were electrolytically destroyed during the adsorption process.

Of course, the presence of oils and particulates in the primary waste water is recognized as having reduced the activity of the highly adsorptive microstructure of the carbon and that the activity remains high after regeneration where the carbon is used for tertiary sewage water treatment.

Comparison of these adsorption results on primary treated waste water at 0.8 volt and the results in Example III of desorption from spent carbon at the same potential suggests that adsorption from that particular waste water solution is best carried out at an applied potential other than 0.8 volt. In fact the optimum potential for adsorbing organic compounds from solution, e.g. primary, secondary, or tertiary treated waste water, depends on the composition of the solution. Similarly, the optimum desorbing potential depends on the organics that are adsorbed on the carbon. Furthermore, different fractions of organics adsorbed on the carbon may desorb best at different potentials. Accordingly, to regenerate a carbon on which a variety of organics are adsorbed, it is preferred to sweep the applied potential through a voltage range over which desorption is found to occur. In actual practice, desorption is carried out with a solution different from that from which the adsorbates were removed. Since the desorbing solution passes through the carbon only once, sweeping the potential through a range can be conducted without concern that it may cause a fraction desorbed at one potential in said range to be readsorbed at another potential in the same selected range.

Although adsorption and desorption according to the invention can be practiced using thin fuel cell type electrodes as in the foregoing examples, the applications of the process on such scale are limited primarily to the laboratory. For large scale plants directed, for example, to tertiary treatment of sewage or treatment of drinking water, a more practical electrode arrangement is required. One possible configuration is a filter press arrangement. However, a preferred electrode configuration is a static bed similar to what has already been used in tertiary water treatment but modified in accordance with the requirements of this invention.

Figure 3:
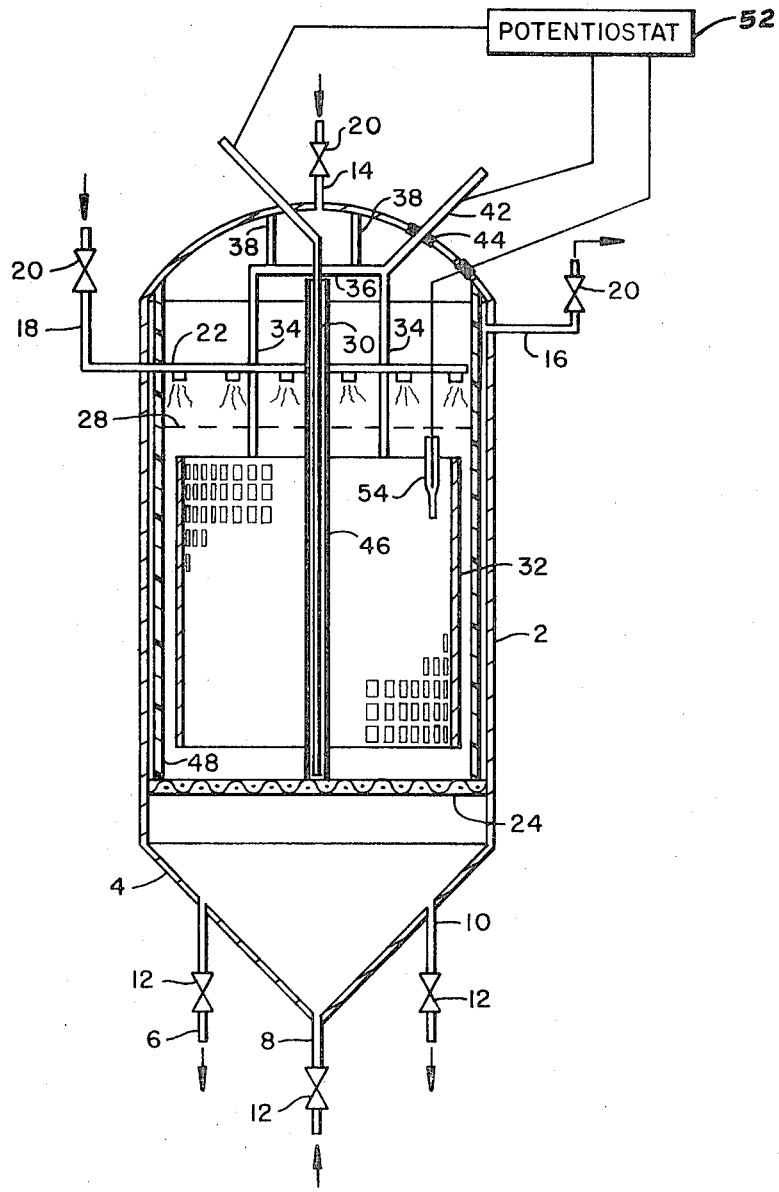
FIG. 3 illustrates an activated carbon adsorber adapted for potential control in accordance with this invention.

A static-bed type of carbon adsorber electrode is shown in FIG. 3. This adsorber electrode system is designed to permit backwash of carbon adsorbant with clean water as well as selective throughflow of feedstock (e.g. the effluent from the secondary treatment stage of a sewage treatment plant) or desorbing solution. It comprises a vessel 2 made of carbon steel or other suitable alloy. The vessel has a tapered bottom 4 which is fitted with three ports to which are connected pipelines 6, 8, and 10, each with their own control valve 12. The upper end of the vessel has three ports to which are connected pipe lines 14, 16, and 18, each of which has its own control valve 20. A multiple spray-head assembly 22 is mounted within the vessel and is connected to receive fluid introduced by pipe line 18. Also mounted within the vessel 2 is a horizontal metal wire grid 24 which supports a bed of activated carbon. For convenience the bed of carbon is omitted from FIG. 3 but the height to which it extends is represented by the broken line 28. Disposed centrally within the bed is a carbon steel rod 30 which is attached to and supported by the upper end wall of the vessel. Rod 30 is electrically connected to the vessel and the two function as a cathode. The vessel also includes an anode in the form of a stainless steel cylindrical screen 32. The openings in the anode screen 32 (typically about ½ inch square) are large enough to allow carbon particles to flow through during backwash expansion so as to minimize the possibility of bridging and channeling. Screen 32 is attached to and supported by a plurality of vertical rods 34 which are secured by one or more cross-members 36 as shown to form a sturdy structure. This structure is secured to and suspended from the upper end wall of the vessel by suitable non-conductive means 38. Although not shown, it is preferred that the anode be equally spaced from rod 30 and vessel 2 so as to provide even distribution of current throughout the carbon bed. Attached to the anode screen supporting structure is a stainless steel rod 42 which extends through a suitable non-conductive sealing member 44 mounted in the upper end wall of the vessel. The cathode consisting of a portion of the vessel and the central carbon steel rod 30 is shielded so as to prevent direct contact with the carbon particles and short circuiting of the anode and cathode. Preferably the shielding consists of porous fiberglass cloth or Teflon sheeting disposed as discrete one or plural ply layers 46 and 48 about rod 30 and the inner surface of vessel 2. The rod 32 is electrically coupled to the vessel 2, and the latter and rod 42 are connected to a potentiostat 52 which monitors the potential of the carbon by means of a suitable reference electrode 54, e.g. a saturated calomel electrode. The potentiostat maintains the carbon bed at the desired potential. Of course, in practice it may be replaced by a simple current source set to provide the desired potential.

The apparatus of FIG. 3 may be used alone or in tandem with other like adsorbers. For example, it is contemplated that four adsorbers may be used with two being desorbed while the other two are adsorbing. For the adsorption part of the cycle, the input solution is introduced via line 18, sprayed by spray-heads 22 onto the carbon bed through which it percolates, and then removed via line 10. At the end of the adsorption cycle, a suitable adsorbing solution, e.g. a 2% solution of $Na_2SO_4$, is introduced through line 14, percolates down through the bed, and is withdrawn via line 6. Thereafter the bed is back-flushed with clear water introduced via line 8 and removed via line 16.

For treatment of water from the secondary treatment stage of a sewage treatment plant, it is preferred that the linear velocity of solution to be treated be in the order of 10 gallons per minute for each square foot of carbon surface area and also that the adsorber (or adsorbers) be sized so that the solution to be treated have a total contact time with the carbon of about one hour. Additionally, the backwash should be at a rate such as to cause about a 30% expansion of the bed. The backwash water may be returned to the primary setting tank of the secondary treatment plant. For treatment of sewage water and for other applications it is preferred that the carbon in the bed be particles with a particle size in the range of 8 to 30 mesh. During the adsorption part of the cycle the potential between the carbon bed and the secondary sewage water should be such that adsorption of organics will readily occur. In practice, this may involve prior setting of the potential by means of a potentiostat or continuous control of the potential by means of the potentiostat. Frequently, it may not be necessary to control the potential of the carbon during adsorption by exterior means. Typically the adsorption part of the cycle may be four or five times longer than the desorption part of the cycle. As necessary for the particular sewage water, desorption may be conducted at more than one potential. By way of example, but not limitation, for a given secondary sewage water the desorption potential may be initially held at +0.8 volt vs. SCE and then changed to 0.0 and −0.3 volt respectively for suitable periods, e.g., one hour periods. No potential is applied during backwash.

Of course the exact potentials required to be used for optimum adsorption and desorption will depend upon the constituents of the solution to be treated. In this connection it is to be noted that the composition of sewage water varies grossly from plant to plant. In some installations the sewage contains oxidizable or reducible materials capable of modifying the potential of an uncontrollable carbon adsorbent and thus causing changes in adsorption characteristics. Accordingly, it is essential to determine by preliminary runs exactly what controlled potentials will provide optimum adsorption-desorption behavior. To reduce power consumption during desorption-regeneration, a fairly concentrated salt solution is used to desorb the carbon.

Of course this invention is also applicable to treatment of solutions other than sewage water. By way of example, the solution to be treated may be polluted drinking water, and chemical and industrial process waste water. The invention is capable of effecting removal of a wide variety of charged and uncharged water polluting species, e.g. organic acids and their salts, amines, phenols, proteins, sugars, milk solids, urea, and anions such as $PO_4^{-3}$ and $NO_3^{-1}$. As with the solutions of Examples I–IV, separation of these water polluting species by adsorption on carbon and removal of these adsorbed species from the carbon can be effected by controlling the potential of the carbon-solution interface.

What is claimed is:

1. A process of separating organic materials from a solution which comprises water, an electrolyte, and said organic materials, comprising passing said solution through a mass of activated carbon, and
   simultaneously providing and maintaining at the interface of said carbon and solution a preselected electrical potential which enhances the power of said carbon to adsorb said organic materials.

2. A process of desorbing organic materials from activated carbon comprising passing a solution which comprises water and an electrolyte through said carbon and providing and maintaining at the interface of said carbon and said solution an electrical potential at a level at which said organic materials are released by said carbon into said solution.

3. A process of enriching a solution which comprises water and an electrolyte with organic materials comprising passing said solution through a mass of activated carbon on which said organic materials are adsorbed, and simultaneously providing and maintaining at the interface of said solution and said carbon an electrical potential at which said organic materials are desorbed from said carbon and dissolve into said solution.

4. A method of treating waste water to remove dissolved organic pollutants comprising: passing said waste water through a mass of activated carbon while providing and holding at the interface of said carbon and waste water a first preselected electrical potential which enhances adsorption of said pollutants by said carbon, interrupting the flow of waste water through said carbon mass, passing an electrolyte solution through said mass of carbon while providing and holding at the interface of said carbon and said electrolyte solution a second preselected electrical potential which enhances desorption of said pollutants from said carbon, interrupting the flow of electrolyte solution, and resuming the flow of waste water through said mass of carbon while again providing and holding said first preselected electrical potential at the interface of said carbon and said waste water.

References Cited

UNITED STATES PATENTS

| | | | |
|---|---|---|---|
| 3,533,929 | 10/1970 | Evans et al. | 204—149 |
| 3,392,102 | 7/1968 | Koch | 204—150 X |
| 3,616,356 | 10/1971 | Roy | 204—149 X |
| 3,515,664 | 6/1970 | Johnson et al. | 204—149 X |
| 1,326,105 | 12/1919 | Schwerin | 252—411 R |
| 3,510,265 | 5/1970 | Kawahata | 210—32 X |
| 3,544,458 | 12/1970 | Sato | 210—243 X |

SAMIH N. ZAHARNA, Primary Examiner

T. G. WYSE, Assistant Examiner

U.S. Cl. X.R.

210—40; 204—149; 252—411